3,388,107
AMINO TERMINATED POLYMERS
Albert J. Costanza, Akron, and Glen E. Meyer, Kent, Ohio, assignors to The Goodyear Tire & Rubber Company, Akron, Ohio, a corporation of Ohio
No Drawing. Continuation-in-part of application Ser. No. 329,227, Dec. 9, 1963. This application Sept. 9, 1966, Ser. No. 578,171
8 Claims. (Cl. 260—79)

ABSTRACT OF THE DISCLOSURE

This invention relates to a method of preparing diamino terminated compounds containing sulfur dispersed in the carbon-carbon chain thereof and to the composition. The diamines are prepared by cleavage of a sulfur-olefin polymer to yield mercaptan terminated composition and reacting this composition with an imine of propylene or ethylene.

---

This application is a continuation-in-part of Ser. No. 329,227 filed Dec. 9, 1963, now abandoned.

This invention relates to a method for making amino terminated polymers containing sulfur interspersed in a predominately hydrocarbon backbone and to said polymers per se.

An object of this invention is to provide a method for stabilizing the cleaved product obtained by the hydrogenolysis of the copolymers of sulfur with conjugated dienes, or sulfur, and conjugated dienes with mono alpha olefin, and thereby obtain a polymeric product which contains terminal amino groups.

The object of this invention is accomplished by taking the cleaved product obtained by the hydrogenolysis of the copolymer of sulfur with a conjugated diene either alone or in conjunction with a mono alpha olefin and reacting the cleaved product with an imine.

The cleaving of the copolymers of sulfur and at least one diene alone or in conjunction with a mono alpha olefin is achieved by treating this copolymer with a solvent to cause the copolymer to swell and then treating the swollen polymer with a hydrogenolitic cleaving agent such as the alkali aluminum hydrides or a combination of metallic zinc and hydrochloric acid. The hydrogenolitic cleaving agent cleaves the sulfur-to-sulfur bonds in the groups of sulfur atoms in the polymer backbone to yield a polymeric product of lower molecular weight, usually about 500 to 10,000 and preferably 1,000 to 5,000. This lower molecular weight polymer also contains at least two mercapto groups per molecule, some monosulfide sulfur in the carbon-to-carbon chain of the cleaved polymer molecule and at least one double bond. The cleaved liquid polymers of this invention have viscosities at 25° C. of from about 20,000 to 100,000 centipoises or higher. The cleaved liquid polymer will contain at least one carbon-to-carbon double bond for each 1,000 units of molecular weight.

The copolymer of sulfur and a conjugated diene per se or of sulfur, a conjugated diene and a mono olefin can be represented by the following sulfur-hydrocarbon general formula:

$$M_a(S_xM_b)_yS_t$$

where M is a monomer unit derived from a conjugated diene having from 4 to about 8 carbon atoms, for example, butadiene, ethyl butadiene, propyl butadiene, isoprene and pentadiene-1,3, and a mono alpha olefin having from 2 to 20 carbon atoms, styrene and those cited hereinafter, S is sulfur, $a$, $b$ and $y$ are integers having values from 1 to 100 or more and with the sum of $a$, $b$ and $y$ being sufficient to give a molecule having a molecular weight of at least about 50 to 100 thousand, and $x$ and $t$ being integers having values of 0 to 8.

The hydrogenolitic cleaved $M_a(S_xM_b)_yS_t$ polymer may be represented by the following formula:

$$HSM_p(S_xM_q)_kSH$$

where M is a monomer unit obtained from a conjugated diene having from 4 to 8 carbon atoms and alpha olefins having from 2 to 20 and preferably less than 10 carbon atoms, $p$, $q$ and $k$ are integers having values of 1 and higher with the sum of $p$, $q$ and $k$ being less than those values which give the cleaved mercaptan terminated polymer a molecular weight greater than about 10,000 and $x$ has values of from 0 to 8 with the proviso that at least some of the $x$'s have values of at least 1.

The present invention may be more fully understood from the following illustrative examples representative of the many combinations of diene monomers and mono alpha olefins which can be used to produce the cleaved polymers useful in this invention. The parts and percentages are by weight unless otherwise designated.

EXAMPLE I

Preparation of sulfur containing polymer

A typical polymerization recipe was as follows:

| | Parts by wt. |
|---|---|
| Water | 200 |
| Fatty acid sodium sulfate | 4 |
| Potassium persulfate | 0.4 |
| Tetra sodium ethylene diamine tetra acetate | 0.9 |
| Iso octyl phenoxy polyethanoxy ethanol nonionic emulsifier | 2 |
| KCl | 1 |
| Hydrochloric acid (conc.) | 0.13 |
| Sulfur | Variable |
| Isoprene | 100 |
| Hydroquinone (shortstop) | 0.15 |

Sulfur, in the form of a 35% dispersion in water, was charged after the reactor had been sealed and just prior to charging the isoprene. The reactor temperature at the start of the polymerization was 130° F. and then gradually was raised to 150° F., in 5° steps, during the first two hours of the polymerization. The shortstop was added after the desired conversion had been reached.

The latices listed below were made at the sulfur level indicated with the above recipe and procedure. The shortstop was added at the indicated conversion.

Latex 8014—Total sulfur, 4.75 parts, one-half charged initially and remainder charged at about 25% conversion. Final conversion, 70%.

Latex 8098—Total sulfur, 2 parts, charged initially. Final conversion, 65%.

Latex 8140—Total sulfur, 2 parts, charged initially. Final conversion, 25%.

Latex 8257—Total sulfur, 3.99 parts, 1.33 parts charged initially and 1.33 parts charged at both 20 and 40% conversion. Final conversion, 65%.

EXAMPLE II

Cleaving the polymer without isolating from latex

Latex 8257, containing 100 grams of polymer was placed in a 3-liter Erlenmeyer flask equipped with a mechanically driven agitator. After starting the agitator, the following ingredients were added:

| | | |
|---|---|---|
| Ditertiary butyl hydroquinone | grams | 1 |
| Benzene | ml | 1000 |
| Zinc dust | grams | 50 |
| and | | |
| Isopropanol | ml | 500 |

After 15 minutes agitation, 150 ml. of concentrated HCl was added incrementally during a period of one hour. Agitation was continued for one hour after the last addition of HCl. The reaction mixture was permitted to stand until it separated into two nearly clear liquid layers with some dark residue on the bottom of the flask. The upper layer, benzene solution containing the cleaved polymer, was separated and treated with a quantity of anhydrous sodium sulfate to remove dissolved water. Another gram of ditertiary-butyl hydroquinone, the stabilizer, was added to the benzene solution containing the cleaved polymer. Then the benzene was evaporated from the solution at room temperature to obtain 85 grams of the cleaved liquid polymer.

Analysis of the polymer indicated 4.42% by weight of mercaptan sulfur in the polymer. The dry polymer of this latex was cleaved with lithium aluminum hydride and worked up to obtain a liquid polymer, which contained 4.4% mercaptan sulfur.

EXAMPLE III

Cleaving with lithium aluminum hydride

The polymer used in this example was formed by the copolymerization of the ingredients of a recipe containing by weight about 75 parts butadiene, 25 parts styrene and 3.6 parts sulfur with the polymerization being carried to about 70% conversion. This polymer contained 4.62% sulfur and after acetone extraction the polymer was found to contain 3.72% by weight of combined sulfur. The extracted polymer (3 parts) was then treated with dry toluene (100 parts) and the mixture was allowed to stand until the polymer exhibited appreciable swelling. A solution consisting of 15 parts of tetrahydrofuran and 0.5 part of lithium aluminum hydride was added to the toluene containing the swollen polymer. The resulting mixture was shaken at frequent intervals and allowed to stand at room temperature. In a short time, about 10 minutes, a liquid phase appeared due to the cleaving of the swollen polymer. Eventually, sufficient ethyl alcohol was added slowly to the mixture to react with the total amount of lithium aluminum hydride present and thereby destroy the excess cleaving agent. The cleaved reaction mixture or cement was washed with sufficient water to remove the alcohol and the other water soluble components from the water insoluble material, i.e. the oily material. The washed organic layer was filtered to remove any finely suspended lithium or aluminum salts. The solvent remaining in the organic phase was removed under a vacuum at room temperature. A typical analysis of the cleaved dry polymer showed the presence of 1.53% thiol sulfur.

Representative examples of the mono alpha olefins are styrene, acrylonitrile, methacrylonitrile, acrylic acid and methacrylic acid and the alkyl esters of these two acids with the alkyl radical containing from 1 to 20 carbon atoms with methacrylate and methyl methacrylate being representative examples.

The amount of the mono alpha olefin used to make the plastic or elastogenic sulfur copolymers cleavable to give the thiol polymers useful in this invention varies rather broadly from as little as about 0 mol percent to as high as about 95 mol percent of mono alpha olefins and higher. Generally the range of mono alpha olefins will be about 5 to 50 mol percent.

Some representative sulfur copolymers useful in this invention are those containing from 1 to 10% and preferably about 1.5 to 5.0% sulfur made by copolymerization with the following olefinic materials:

A. Butadiene
B. 10–90% butadiene, 90–10% styrene
C. 10–90% butadiene, 90–10% acrylonitrile
D. Isoprene
E. 10–90% isoprene, 90–10% styrene
F. 10–90% isoprene, 90–10% acrylonitrile.

The solvents useful in cleaving the sulfur-olefin polymers to give the thiol polymer useful in this invention are those capable of swelling the sulfur copolymer but are inert to the hydrogenolysis agents being used. When the zinc-hydrochloric acid combination is used it is necessary that some water be present, about 1 to 10% by weight, so mixtures of a water miscible and immiscible solvent such as benzene and ethanol toluene and isopropanol, toluene and ethanol, benzene and acetic acid, or xylene and ethanol are required to promote contact by the water. When lithium aluminum hydride is used it is necessary to operate under anhydrous conditions and in the absence of compounds possessing active hydrogens such as alcohols and acids. Aromatic solvents such as benzene and toluene, etc., as well as aliphatic solvents such as hexane, heptane, cyclohexane, etc., may be used for swelling the polymer. Ethers such as tetrahydrofuran, diethylether may be used to dissolve the lithium aluminum hydride so it may be added to the swollen polymer conveniently as a solution. The preferred solvents are heptane for swelling the polymer and tetrahydrofurane for dissolving the lithium aluminum hydride.

EXAMPLE IV

Twenty-five parts of a liquid thiol terminated polymer prepared by cleaving a sulfur isoprene copolymer of Example I by the procedure of Example II and having a thiol equivalent weight of 1060 was mixed in a pressure vessel with 14 parts of ethylene imine and maintained at 100° C. for 16 hours. Then a vacuum was placed on the vessel for 2.5 hours to remove the unreacted ethylene imine. The residue in the vessel had lost its mercaptan odor and had an amine value of 390 for its equivalent weight. These amino terminated polymers have the following structure:

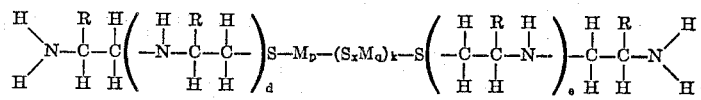

where R is hydrogen when ethylene imine is used and methyl when propylene imine is used, and $d$ and $e$ are integers having values from 0 to about 20 depending on the amount of ethylene-imine used.

Instead of ethylene imine, propylene imine may be used in accordance with the procedure of Example IV to give amino terminated polymers of the above structure with the mercaptan products of Examples II through III.

These amino terminated polymers can be prepared more readily by reacting under pressure at a temperature of about 75 to 150° C. and preferably about 90 to 110° C. for about 1 to 3 or more hours. The resulting amino terminated polymers react with carboxylic acids and organic isocyanates to produce amides and ureas, where the carboxylic acid or organic isocyanates are polyfunctional and the resulting polyamides or polyureas are useful as potting compositions and caulks.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter having the following structure:

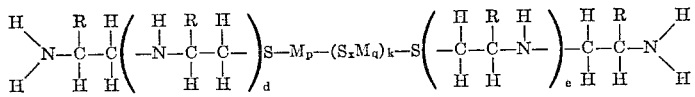

where R is selected from the radicals consisting of hydrogen and methyl; M is a monomer unit derived from an olefin selected from the class consisting of a conjugated diene having from 4 to about 8 carbon atoms and a mixture of said conjugated diene and a mono alpha olefin having from 2 to about 20 carbons atoms; $p$, $q$ and $k$ are integers having values of at least 1 with their sum being less than those values which give the molecule a molecular weight greater than about 10,000; $x$ is an integer having values of from 1 to 8; and $d$ and $e$ are integers having values of 0 to about 20.

2. The composition of claim 1 wherein R is hydrogen.
3. The composition of claim 1 wherein R is methyl.
4. The composition of claim 1 wherein M is derived from isoprene.
5. The composition of claim 1 wherein M is a monomer unit derived from a conjugated diene having 4 to 8 carbon atoms.
6. The method of making the product of claim 1 comprising (1) cleaving a composition of the structure $M_a(S_xM_b)_yS_t$ where M is a monomer unit derived from an olefin selected from the class consisting of a conjugated diene having from 4 to about 8 carbon atoms and a mixture of said conjugated diene and a mono alpha olefin having from about 2 to about 20 carbon atoms; $a$, $b$ and $y$ are integers having values of at least 1 with their sum being sufficient to give a molecule having a molecular weight of at least 50,000; and $x$ and $t$ are integers having values of 1 to 8 with a cleaving agent selected from the group consisting of (a) lithium aluminum hydride, the cleaving with the lithium aluminum hydride occurring under anhydrous condition and (b) the combination of zinc and hydrochloric acid, the cleaving with the combination of zinc and hydrochloric acid occurring under water conditions, and (2) reacting the cleaved product under pressure and at a temperature of about 100° C. with an imine selected from the group consisting of ethyleneimine and propylenimine.

7. The method of claim 6 wherein M is a monomer unit derived from a conjugated diene having 4 to 8 carbon atoms.
8. The method of claim 6 wherein the total amount of sulfur in $M_a(S_xM_b)_yS_t$ is less than ten percent by weight.

References Cited

UNITED STATES PATENTS

| | | | |
|---|---|---|---|
| 2,304,623 | 12/1942 | Berchet | 260—79 |
| 3,282,901 | 11/1966 | Warner et al. | 260—79.1 |
| 3,332,914 | 7/1967 | Constanza | 260—79 |

FOREIGN PATENTS

| | | |
|---|---|---|
| 859,470 | 1/1961 | Great Britain. |

DONALD E. CZAJA, *Primary Examiner.*

M. I. MARQUIS, *Assistant Examiner.*